(12) United States Patent
Kim et al.

(10) Patent No.: US 7,532,281 B2
(45) Date of Patent: May 12, 2009

(54) LIQUID CRYSTAL DISPLAY DEVICE

(75) Inventors: Do Yeon Kim, Busan-si (KR); Su Dong Roh, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 446 days.

(21) Appl. No.: 10/967,151

(22) Filed: Oct. 19, 2004

(65) Prior Publication Data
US 2005/0140870 A1    Jun. 30, 2005

(30) Foreign Application Priority Data
Dec. 30, 2003    (KR) ...................... 10-2003-0100696

(51) Int. Cl.
G02F 1/1333    (2006.01)
G02F 1/139     (2006.01)
(52) U.S. Cl. ..................... 349/114; 349/128; 349/129; 349/178
(58) Field of Classification Search ................. 349/113, 349/114, 128, 129, 130, 178, 42, 43, 87, 349/92, 156, 160; 345/87, 92
See application file for complete search history.

(56) References Cited

U.S. PATENT DOCUMENTS 6,522,377 B2 * 2/2003 Kim et al. ................... 349/114
6,922,223 B2 * 7/2005 Ma et al. .................... 349/129
2004/0160556 A1 * 8/2004 Tsuchiya et al. ............ 349/114

FOREIGN PATENT DOCUMENTS

CN    1573430 A    6/2003

* cited by examiner

Primary Examiner—David Nelms
Assistant Examiner—Tai Duong
(74) Attorney, Agent, or Firm—McKenna Long & Aldridge LLP

(57) ABSTRACT

A liquid crystal display device includes a first substrate, wherein a pixel region is defined by a gate line and a data line, the pixel region is divided into a reflection region and a transmission region, an electric field guide window is formed on the transmission region, a pixel electrode is formed on the pixel region, and a predetermined step difference part is formed on a boundary between the reflection region and the transmission region, a second substrate facing the first substrate and having a dielectric rib spaced apart by a predetermined distance from the electric field guide window, and a liquid crystal layer interposed between the first and the second substrates.

18 Claims, 3 Drawing Sheets

LIQUID CRYSTAL DISPLAY DEVICE

This application claims the benefit of Korean Patent Application No. 100696/2003 filed on Dec. 30, 2003, which is hereby incorporated by reference for all purposes as if fully set forth herein.

BACKGROUND OF THE INVENTION

1. Field of the Invention

The present invention relates to a liquid crystal display device, and more particularly, to a liquid crystal display device capable of preventing disclination and improving the aperture ratio.

2. Discussion of the Related Art

Liquid crystal display (LCD) devices have advantages such as low voltage operation, low power consumption, light weight, slim profile, and full color. The LCD device is widely used as a display for watches and calculators, computer monitors, television monitors, television sets, and hand-held terminals.

The TN (Twisted Nematic) mode LCD device has a problem in that the viewing angle is narrow. Accordingly, the technologies for increasing such a viewing angle are being studied. Technologies with wider viewing angles include In-Plane Switching (IPS) mode LCD devices and Vertical Alignment (VA) mode LCD devices.

The IPS mode LCD device widens the viewing angle by forming a pixel electrode and a common electrode together, on a thin film transistor (TFT) substrate. The liquid crystal is operated by a lateral electric field in the horizontal direction. However, the IPS mode LCD device has a problem in that the aperture ratio is lower due to its structural characteristics.

The VA mode LCD device uses a negative-type liquid crystal having a negative (−) dielectric anisotropy. Namely, when a voltage is not applied, a direction along a longer axis of a liquid crystal molecule is arranged perpendicularly with respect to the plane of an alignment layer. When a voltage is applied, the liquid crystal molecule is arranged in parallel with the plane of the alignment layer. An image is displayed by adjusting light transmittance using this property.

The VA mode LCD device distorts the electric field applied to the liquid crystal layer by having, on the substrate, an auxiliary electrode, an electric field guide window, and a dielectric rib. It aligns a director of the liquid crystal molecule using the distorted electric field to a predetermined direction, thereby widening the viewing angle.

FIG. 1 illustrates a plan view of a unit pixel of a VA mode LCD device according to the related art, and FIG. 2 illustrates a cross-sectional view taken along line I-I' of FIG. 1. Referring to FIGS. 1 and 2, the VA mode LCD device includes: first and second substrates 1 and 2; a gate line 7 and a data line 9 respectively formed in horizontal and vertical directions on the first substrate 1 to define a pixel region; a pixel electrode 13 divided into a plurality of electrodes by an electric field guide window 14 formed on the pixel region; an auxiliary electrode 11 formed on the same layer as the gate line 7; a gate insulating layer 3 formed on the first substrate 1 including the gate line 7; a passivation layer 5 formed on the gate insulating layer 3 including the data line 9; a black matrix layer 4 formed on the second substrate 2; a color filter layer 6 formed on the second substrate 2 including the black matrix 4; a common electrode 8 formed on the color filter layer 6; a dielectric rib 10 formed on the common electrode 8; a liquid crystal layer 20 interposed between the first and the second substrates 1 and 2; a first alignment layer 15 formed on the passivation layer 5; and a second alignment layer 12 formed on the common electrode 8.

The first and the second alignment layers 15 and 12 may be alignment-processed using a polyamide or polyimide-based compound, polyvinylalcohol (PVA), polyamic acid or the like. A multi-domain pixel that is alignment-processed in a plurality of directions, may be formed on any of the first and the second alignment layers 15 and 12. The LCD device that is alignment-processed in the multi-domain in this manner is called a multi-domain vertical alignment (MVA) mode LCD device. The VA mode LCD device that will be described below refers to a MVA mode LCD device.

In the VA mode LCD device according to the related art, when an electric field is generated between the pixel electrode 13 formed on the first substrate 1 and the common electrode 8 formed on the second substrate 2, a fringe field is formed by the electric field guide window 14 and the dielectric rib 10 so that the liquid crystal molecules are aligned differently depending on the fringe field, whereby the viewing angle is compensated. At this time, the alignment angle or the direction of the liquid crystal can be controlled by using the voltage applied to the auxiliary electrode 11 formed on the first electrode 1.

However, in the VA mode LCD device, disclination is generated at the electric field guide window 14 or the dielectric rib 10. Accordingly, the desired image is not displayed on the part where the disclination is generated and image quality is thus deteriorated.

Also, because the distance between the electric field guide window 14 and the dielectric rib 10 is narrow (about 25 μm) in the VA mode LCD device of the related art, there has been a problem in that the aperture ratio deteriorates and a stable texture is hard to obtain.

SUMMARY OF THE INVENTION

Accordingly, the present invention is directed to an LCD device that substantially obviates one or more problems due to limitations and disadvantages of the related art.

An advantage of the present invention is to provide an LCD device capable of preventing disclination and improving aperture ratio using a step difference due to a cell gap in the reflection region and the transmission region.

Additional advantages, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these other advantages and in accordance with the purpose of the invention, as embodied and broadly described herein, an LCD device includes: a first substrate, wherein a pixel region is defined by a gate line and a data line, the pixel region is divided into a reflection region and a transmission region, an electric field guide window is formed on the transmission region, a pixel electrode is formed on the pixel region, and a predetermined step difference part is formed on a boundary between the reflection region and the transmission region; a second substrate facing the first substrate and having a dielectric rib spaced apart by a predetermined distance from the electric field guide window; and a liquid crystal layer interposed between the first and the second substrates.

The electric field guide window may be formed on a central part of the transmission region.

Alternatively, a cell gap in the transmission region is twice greater than a cell gap in the reflection region.

The step difference part may be formed by a step difference layer formed on a lower part of the pixel electrode that corresponds to the reflection region.

At least more than two step difference layers may be formed per the pixel region.

The step difference layer may be symmetrically formed on left and right of the electric field guide window.

The pixel electrode may be separated into more than two parts by the electric field guide window.

A reflector may be formed on the pixel electrode that corresponds to the reflection region and on a boundary between the reflection region and the transmission region.

It is preferable that the dielectric rib is spaced apart by a distance range of 30-70 μm from the electric field guide window. By widening the distance between the dielectric rib and the electric field guide window in this manner, the aperture ratio may be improved.

The dielectric rib may be formed corresponding to the pixel electrode formed on the reflection region.

First and second alignment layers having a plurality of domains aligned in different directions each other, may be formed on each of the first and the second substrates.

The pixel electrode may be divided into one transmission region and at least more than two reflection regions.

The fringe field generated at the step difference part can guide the fringed field, in the same direction, generated between the electric field guide window and the step difference part, whereby directions of liquid crystals of the liquid crystal layer are the same in regions of both fringe fields. As a result, disclination generated at the electric field guide window can be prevented.

Also, the fringe field generated at the step difference part can guide the fringed field, in the same direction, generated between the step difference part and the dielectric rib, whereby directions of liquid crystals of the liquid crystal layer are the same in regions of both fringe fields. As a result, disclination generated at the dielectric rib can be prevented.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to exemplary embodiments of the present invention, examples of which are illustrated in the accompanying drawings.

The present invention is designed to solve the problem of image quality deterioration due to generation of disclination as well as aperture ratio deterioration, and the present invention utilizes the reflection region and the transmission region used in the light transmission LCD device.

Figure 1:
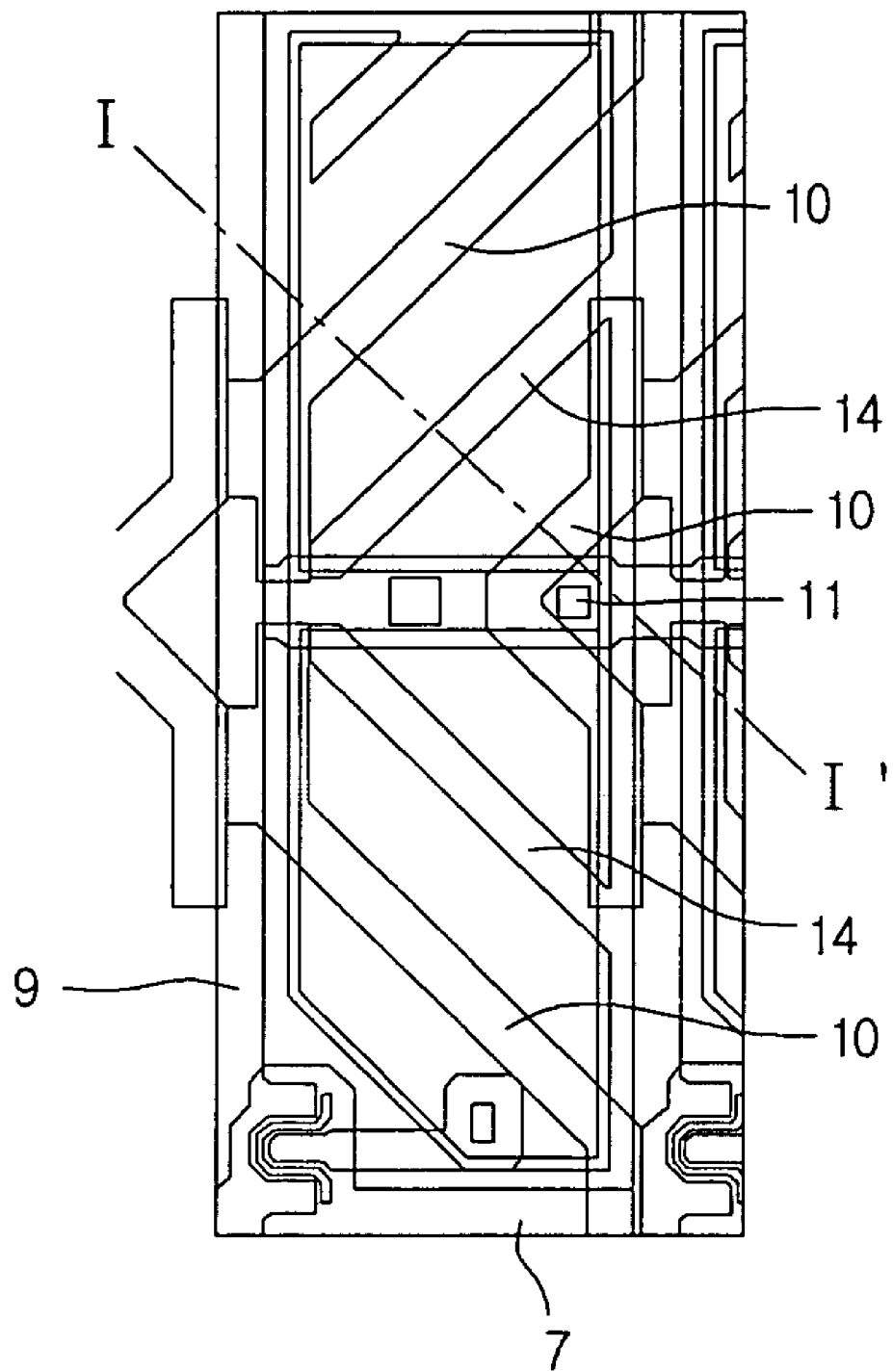
FIG. 1 illustrates a plan view of a unit pixel of a VA mode LCD device of the related art.
Figure 2:
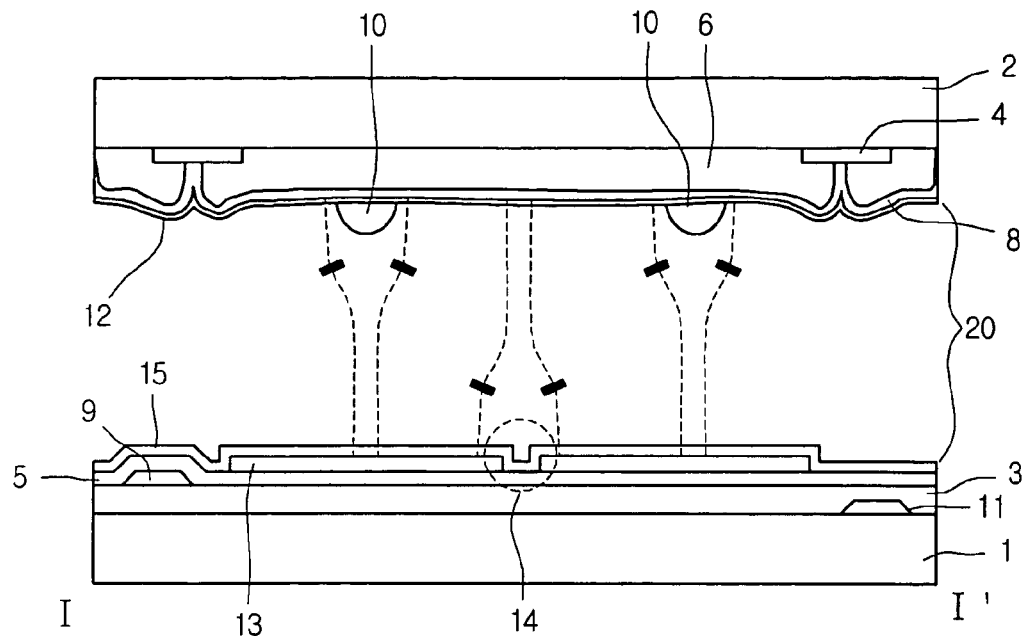
FIG. 2 illustrates a cross-sectional view taken along the line I-I' of FIG. 1.
Figure 3:
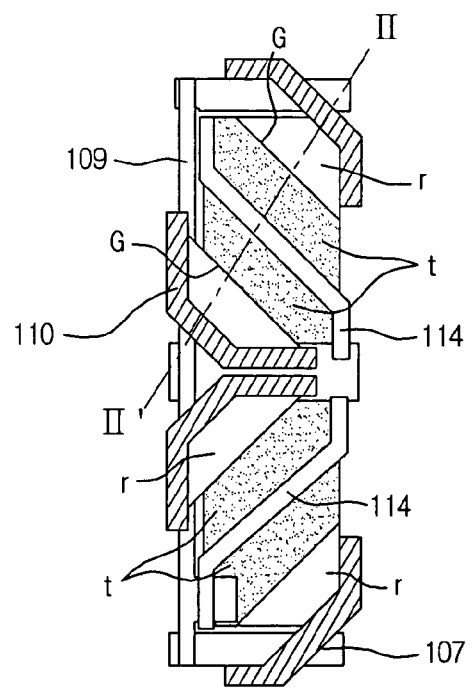
FIG. 3 illustrates a plan view of a unit pixel of a VA mode LCD device according to a preferred embodiment of the present invention.
Figure 4:
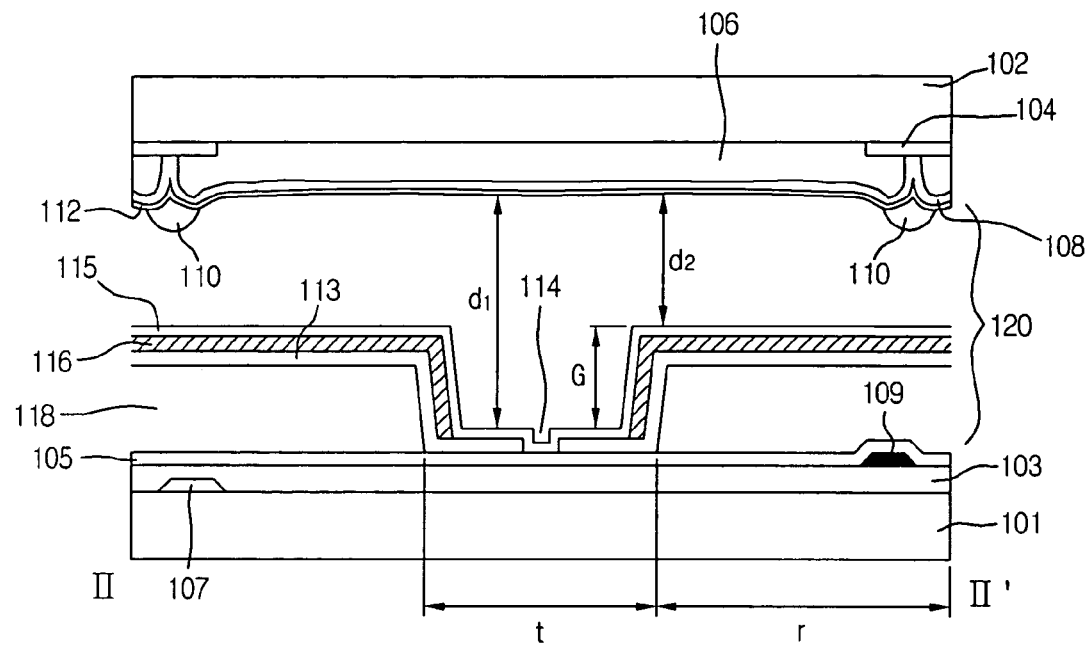
FIG. 4 illustrates a cross-sectional view taken along the line II-II' of FIG. 3.

FIG. 3 illustrates a plan view of a unit pixel of a VA mode LCD device according to a preferred embodiment of the present invention, and FIG. 4 is a cross-sectional view taken along the line II-II' of FIG. 3.

Referring to FIGS. 3 and 4, the VA mode LCD device includes: a first substrate 101, in which a pixel region is defined by a gate line 107 and a data line 109, the pixel region is divided into a reflection region r for reflecting light and a transmission region t for transmitting light, an electric field guide window 114 is formed on the transmission region t, a pixel electrode 113 is formed on the pixel region, and a predetermined step difference part is formed on a boundary between the reflection region r and the transmission region t; a second substrate 102 facing the first substrate 101 and having a dielectric rib 110 spaced apart by a predetermined distance from the electric field guide window 114; and a liquid crystal layer 120 interposed between the first and second substrates 101 and 102.

The gate line 107 and a gate electrode (not shown) constituting a thin film transistor are formed on the first substrate 101. A gate insulating layer 103 is formed on the first substrate 101 including the gate line 107. On the gate insulating layer 103, the data line 109 and a source/drain electrode (not shown) constituting the thin film transistor is formed. On the first substrate 101 including the data line 109, a passivation layer 105 is formed. Here, the thin film transistor may include a gate electrode, a source/drain electrode, and an active layer (not shown). The gate insulating layer 103 and the passivation layer 105 may be formed of materials such as benzocyclobutene (BCB), acrylic resin, polyamide compound, SiNx, or SiOx.

As described above, according to the present invention, the predetermined step difference part G is formed on the boundary between the reflection region r and the transmission region t. Namely, the step difference part G may be symmetrically formed on left and right of the electric field guide window 114. In other words, if the electric field guide window 114 exits, two step difference parts G may be formed in the vicinity of the electric field guide window 114. The step difference part G is intended to prevent disclination, respectively generated from the electric field guide window 114 and the dielectric rib 110.

To form the step difference part G, a step difference layer 118 is formed on the passivation layer 105 that corresponds to the reflection region r. The step difference layer 118 is not formed on the passivation layer 105 that corresponds to the transmission region t. As a result, the step difference part G may be formed on the boundary between the transmission region t and the reflection region r.

At least more than two step difference layers 118 may be formed per unit pixel region. One pixel region may be divided into one transmission region t and at least more than two reflection regions r.

In addition, the pixel electrode 113 is formed on the first substrate 101 including the step difference layer 118. At this point, the pixel electrode 113 completely covers the step difference layer 118 and extends to a central part of the transmission region t. The pixel electrode 113 is separated by means of the electric field guide window 114. Namely, the pixel electrode 113 is not on the electric field guide window 114. Accordingly, the electric filed guide window 114 is indented as much as the thickness of the pixel electrode 113. Also, the neighboring pixel electrodes are separated by the electric field guide window 114. Therefore, at least more than two pixel electrodes may be formed on one unit pixel region. The pixel electrodes separated by the electric field guide window 114 are preferably mutually connected. The pixel electrode 113 may be formed of indium tin oxide (ITO) or indium zinc oxide (IZO). In that case, the electric field guide window 114 is improved in its display element characteristics such as the response characteristics, the operation voltage as the number of the electric field guide window 114 increases, but in addition, reduction in the aperture ratio results. Therefore, appropriate control of the number of the electric field guide window 114 is required.

The pixel electrode 113 may also be formed on the remaining part other than the electric field guide window 114 in the transmission region t.

A reflector 116 may be formed on the pixel electrode that corresponds to the reflection region r and on a boundary between the reflection region r and the transmission region t. At this point, the reflector 116 reflects all of the incident ambient light in the reflection region r back through the second substrate 102.

A first alignment layer 115 having a plurality of domains aligned in different directions from each other is formed on the first substrate 101. A plurality of domains are generally called 'multi-domain'. Due to such a multi-domain, the liquid crystal molecules may be aligned in different directions in advance.

To reduce a difference between distances that the light travels in the transmission region t and the reflection region r, a cell gap of the transmission region t is about twice greater than a cell gap of the reflection region r.

Generally, a phase difference value δ of a liquid crystal is obtained by the following formula:

$$\delta = \Delta n \cdot d$$

Where δ is the phase difference of a liquid crystal, Δn is the refractive index of a liquid crystal, and d1 is the cell gap.

Therefore, a difference in the optical efficiency is generated between the reflection mode for reflecting light and the transmission mode for transmitting light. To reduce such a difference in optical efficiency, the cell gap d1 of the transmission region t should be greater than the cell gap d2 of the reflection region r, so that the phase difference value of the liquid crystal layer 320 may be maintained constant. Accordingly, the thickness of the step difference part G should be about half of the cell gap d1 of the transmission region t. If the thickness of the step difference part G is about half of the cell gap d1 of the transmission region t, the cell gap d2 of the reflection region r gets reduced as much as the thickness of the step difference part G. Accordingly, the cell gap d1 of the transmission region t is twice the cell gap d2 of the reflection region r, so that the optical efficiency may be improved.

In the meantime, a black matrix 104 for shielding light is formed on the second substrate 102. The black matrix 104 is positioned between the pixel regions, and prevents light that has passed through the color filter layer 106 from progressing through to second substrate 102 in an adjacent pixel region.

On the second substrate 102 including the black matrix 104, a color filter layer 106 is formed where a red sub-color filter R, a green sub-filter G, and a blue sub-filter B are alternately arranged. A common electrode 108 to which a common voltage is applied is formed on the color filter layer 106. The common electrode 108 may be made of ITO.

Also, a second alignment layer 112 having a multi-domain alignment in different directions from each other is formed on the common electrode 108. Due to the multi-domain, the liquid crystal molecules may be aligned in different directions from each other in advance.

A dielectric rib 110 placed a predetermined distance from the electric field guide window 114 formed on the transmission region t is formed on the second alignment layer 112. The dielectric rib 110 may be about 30-70 μm from the electric field guide window 114.

In addition, the distance between the dielectric rib 110 and the electric field guide window 114 may be 50 μm.

The dielectric rib 110 may be formed corresponding to the pixel electrode 113 formed in the reflection region r. Therefore, at least more than two dielectric ribs 110 may be formed.

The permittivity of the dielectric rib 110 may be the same as or less than that of the liquid crystal. Also, the dielectric rib 110 may be made of photosensitive material, for example, photoacrylate, or benzocyclobutene (BCB).

In FIG. 4, the liquid crystal of the liquid crystal layer 120 has a negative characteristic, i.e. has a negative (−) dielectric anisotropy. Also, the liquid crystal of the liquid crystal layer 120 is doped with a chiral dopant so that molecular alignment with respect to an optical axis of the liquid crystal is constantly adjusted by application of the electric field.

On an outer surface of at least any of the first and the second substrates 101 and 102, a phase difference film (not shown) may be formed. The phase difference film enlarges the region where gray inversion does not occur, by complementing the viewing angle between the direction perpendicular to the substrate and the direction depending on a wide viewing angle change, and enhances the contrast ratio in the diagonal direction.

The phase difference film may be made of a negative uniaxial film having one optical axis or of a negative biaxial film having two optical axes. In one exemplary embodiment, the negative biaxial film is more often used to achieve the wide viewing angle.

Also, on an outer surface of each of the first and the second substrates 101 and 102, first and second polarizing plates (not shown) may be additionally provided. The first and the second polarizing plates may be integrally formed with the phase difference film. Also, the optical transmission axis of the first polarizing plate has an angle of 90° to that of the second polarizing plate.

Figure 5:
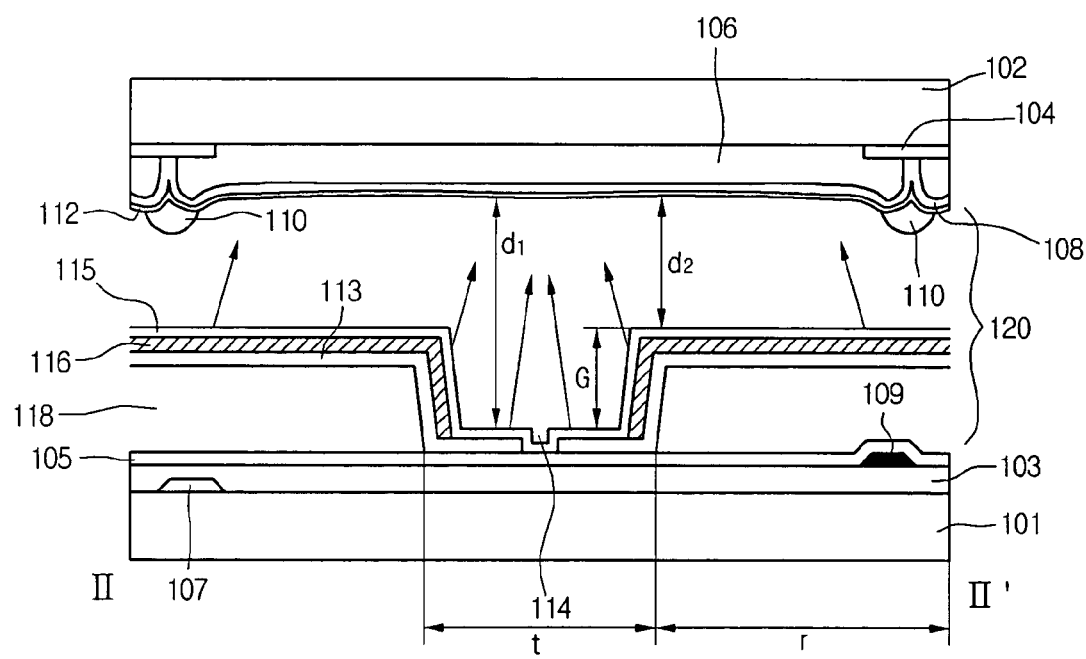
FIG. 5 illustrates a drawing showing a direction of a fringe field of a VA mode LCD device according to a preferred embodiment of the present invention.

FIG. 5 is a drawing showing a fringe field direction of a VA mode LCD device according to a preferred embodiment of the present invention.

As shown in FIG. 5, the pixel region is divided into the reflection region r and the transmission region t. There may exist, on the pixel region, one transmission region t and at least more than two reflection regions r.

On a central part of the transmission region t in the first substrate 101, the electric field guide window 114 indented inward is formed, and on the remaining part of the transmission region t, other than the electric field guide window 114, the pixel electrode 113 is formed. On a lower side of the pixel electrode 113 in the reflection region r, the step difference layer 118 is formed providing the step difference part G that has a predetermined step difference. Therefore, the step difference part G is formed on the boundary between the reflection region r and the transmission region t. Also, the reflector 116 is formed on the pixel electrode 113 that corresponds to the reflection region r and on a boundary between the reflection region r and the transmission region t.

The dielectric rib 110 is formed on the second substrate 102, and is a predetermined distance from the electric field guide window 114 formed on the first substrate 101.

As illustrated in FIG. 5, a first cell gap between the first alignment layer 115 of the first substrate 101 and the second alignment layer 112 of the second substrate 102 in the reflection region r, is given by d1. Also, a second cell gap between the first alignment layer 115 of the first substrate 101 and the second alignment layer 112 of the second substrate 102 in the transmission region t, is given by d2. At this point, a difference between the first cell gap d1 and the second cell gap d2 becomes the thickness of the step difference part G.

The first cell gap d1 may be twice the second cell gap d2. By making the first cell gap d1 twice the second cell gap d2, the optical transmittance becomes uniform and the optical efficiency may be improved. Accordingly, the thickness of the step difference part G becomes half of the first cell gap d1.

According to the present invention, the fringe field is generated at the electric field guide window 114 and the dielectric rib 110. Also, according to the present invention, the fringe field is generated at the step difference part G. At this point, disclination is generated at the electric field guide window 114 and the dielectric rib 110. Disclination means that the alignment of the liquid crystal molecules changes discontinuously due to the electric field window 114 and the dielectric rib 110.

Because a disclination line occurs when light is shielded in a NW (Normally White) mode, the contrast ratio is lowered. To solve this problem, the part where the disclination line occurs is covered with the black matrix. However, because the disclination line occurs at a bright state in a NB (Normally Black) mode, the contrast ratio is reduced, so that the disclination line need not necessarily to be covered with the black matrix.

According to the present invention, the step difference part G is formed at the boundary between the transmission region t where the electric field guide window 114 is formed and the reflection region r where the dielectric rib 110 is formed, whereby the disclination can be prevented. Namely, the fringe field can also be generated even by the step difference part G. Accordingly, the fringe field generated at the step difference part G guides the direction of the fringe field generated at the electric field guide window 114 and the direction of the fringe field generated at the step difference part G to the same direction, Also, the fringe field generated at the step difference part G guides the direction of the fringe field generated at the dielectric rib 110 and the direction of the fringe field generated at the step difference part G to the same direction. As a result, the disclination is not generated.

As is apparent from the foregoing, according to the present invention, by forming the step difference part at the boundary between the transmission region where the electric field guide window is formed and the reflection region where the dielectric rib is formed, it is possible to prevent disclination from occurring, using the fringe field generated at the step difference part.

Also, according to the present invention, by widening an interval between the electric field guide window and the dielectric rib, the aperture ratio may be improved.

Also, according to the present invention, a pretilt is provided, so that more stable texture may be realized.

It will be apparent to those skilled in the art that various modifications and variations may be made in the present invention. Thus, it is intended that the present invention covers the modifications and variations of this invention provided they come within the scope of the appended claims and their equivalents

What is claimed is:

1. A liquid crystal display device comprising:
   a first substrate, wherein a pixel region is defined by a gate line and a data line, the pixel region is divided into a reflection region and a transmission region, an electric field guide window is on the transmission region, a pixel electrode is on the pixel region, and a predetermined step difference part is on a boundary between the reflection region and the transmission region;
   a second substrate facing the first substrate and having a dielectric rib spaced a predetermined distance from the electric field guide window; wherein the data line is substantially opposite the dielectric rib; and
   a liquid crystal layer interposed between the first and the second substrates.

2. The liquid crystal display according to claim 1, wherein the electric field guide window is at a center of the transmission region.

3. The liquid crystal display according to claim 1, wherein a cell gap of the transmission region is greater than a cell gap of the reflection region.

4. The liquid crystal display according to claim 1, wherein the step difference part is formed by a step difference layer formed on a lower side of the pixel electrode that corresponds to the reflection region.

5. The liquid crystal display according to claim 1, wherein at least more than two step difference layers are formed per the pixel region.

6. The liquid crystal display according to claim 1, wherein the step difference part is symmetrically formed on either side of to the left and right of on either side of the electric field guide window.

7. The liquid crystal display according to claim 1, wherein the pixel electrode is divided into greater than two parts by the electric field guide window.

8. The liquid crystal display according to claim 1, wherein a reflector is on the pixel electrode that corresponds to the reflection region and a boundary between the reflection region and the transmission region.

9. The liquid crystal display according to claim 1, wherein the dielectric rib is formed corresponding to the pixel electrode formed in the reflection region.

10. The liquid crystal display according to claim 1, wherein the electric field guide window has an indented shape.

11. The liquid crystal display according to claim 1, wherein first and a second alignment layers having a plurality of domains aligned in different directions from each other are formed on each of the first and the second substrates.

12. The liquid crystal display according to claim 1, wherein a liquid crystal contained in the liquid crystal layer has a negative dielectric anisotropy.

13. The liquid crystal display according to claim 1, wherein the pixel region is divided into one transmission region and at least two reflection regions.

14. The liquid crystal display according to claim 1, wherein a fringe field generated at the step difference part guides, in the same direction, a fringe field generated between the electric field guide window and the step difference part, whereby directions of liquid crystals are the same in regions of both fringe fields.

15. The liquid crystal display according to claim 1, wherein a fringe field generated at the step difference part guides, in the same direction, a fringe field generated between the step difference part and the dielectric rib, whereby directions of liquid crystals are the same in regions of both fringe fields.

16. The liquid crystal display according to claim 1, wherein a fringe field generated at the electric field guide window guides, in the same direction, a fringe field generated between the electric field guide window and the dielectric rib, whereby directions of liquid crystals are the same in regions of both fringe fields.

17. A liquid crystal display device comprising:
a first substrate, wherein a pixel region is defined by a gate line and a data line, the pixel region is divided into a reflection region and a transmission region, an electric field guide window is on the transmission region, a pixel electrode is on the pixel region, and a predetermined step difference part is on a boundary between the reflection region and the transmission region;
a second substrate facing the first substrate and having a dielectric rib spaced a predetermined distance from the electric field guide window; and
a liquid crystal layer interposed between the first and the second substrates wherein the dielectric rib is approximately 30-70 μm from the electric field guide window.

18. A liquid crystal display device comprising:
a first substrate, wherein a pixel region is defined by a gate line and a data line, the pixel region is divided into a reflection region and a transmission region, an electric field guide window is on the transmission region, a pixel electrode is on the pixel region, and a predetermined step difference part is on a boundary between the reflection region and the transmission region;
a second substrate facing the first substrate and having a dielectric rib spaced a predetermined distance from the electric field guide window; and
a liquid crystal layer interposed between the first and the second substrates wherein the dielectric rib is approximately 50 μm from the electric field guide window.

* * * * *